Patented June 16, 1931

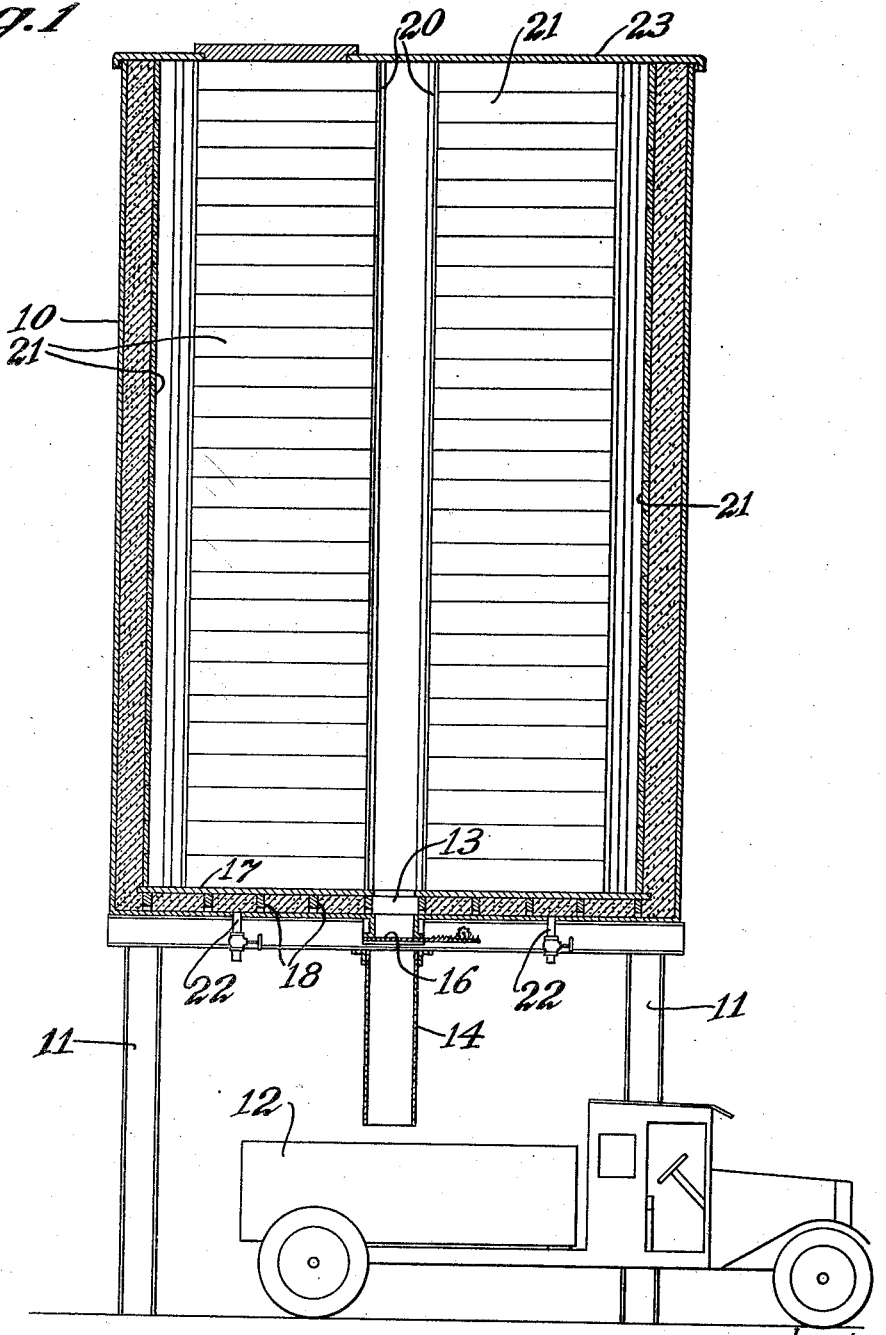

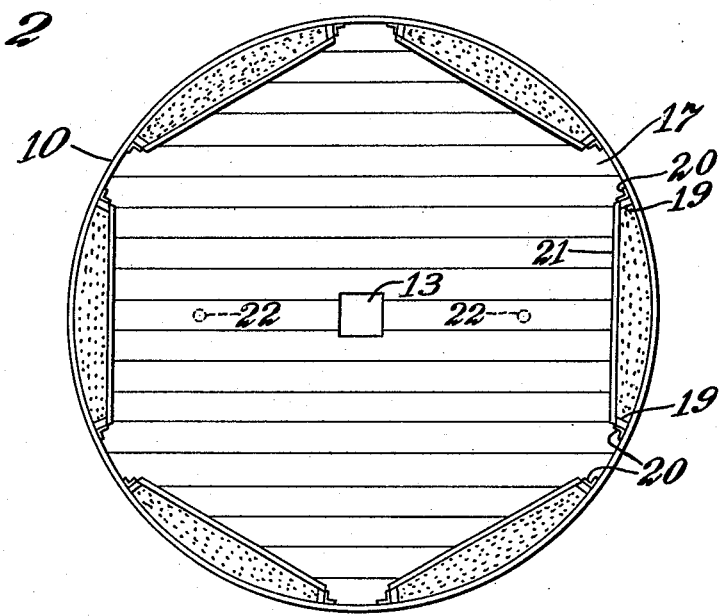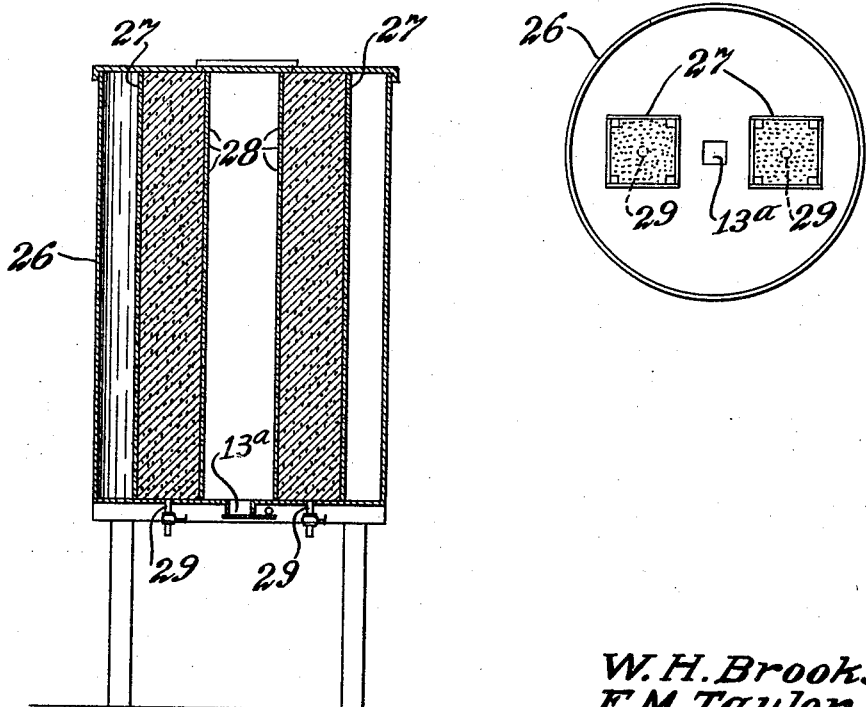

1,810,125

UNITED STATES PATENT OFFICE

WILLIAM H. BROOKS AND FRANCIS M. TAYLOR, OF BIRMINGHAM, ALABAMA

APPARATUS FOR AGING PLASTIC MIXTURES

Application filed August 16, 1928. Serial No. 300,128.

Our invention relates to apparatus and a method for aging lime putty and like plastic mixtures, and has for its object the provision of apparatus and a method of the character designated which shall be simple of design and of operation and wherein the aging of the mixture may be maintained under definite control.

A further object of our invention is to provide an aging tank for lime putty and like plastic mixtures and embodying means for readily controlling the aging of the mixture and means whereby the aged mixture may be removed from the apparatus by gravity for delivery to the user.

A more specific object of our invention is to provide apparatus for aging lime putty and like plastic mixtures adapted for the supply of builders over a considerable area of building operations and embodying means whereby the mixtures may be properly aged under controlled conditions and readily delivered to the users, with a minimum of labor and expense.

As is well understood in the art to which our invention relates, building plaster, comprising a mixture of commercial lime and water and known to the trade as "lime putty," is usually made up on the job where the building is being erected. It is furthermore well known that such a mixture, due to the limitations of time and apparatus available, is difficult to age properly under such conditions and, when aged improperly and applied to the walls of a building, is liable to crack and blister due to reactions occurring in the plaster after it is applied. It is also a tedious and laborious process to prepare and age putty properly on the job and have it ready for use when needed. Among other difficulties, if the water content is too great, the putty is too soft, and if too little the putty hardens prematurely and is unfit for use.

As is well known, lime putty, if allowed to stand in an ordinary water tight tank, partially separates from the water, the heavier solid portion of the putty settling to the bottom and the water rising to the top. In order to have the right consistency and plasticity for working, it is necessary for the water content to be a fairly constant percentage, about 60%, of the whole mixture, when aged, and to be uniformly distributed through the mass. Due to the settling characteristics of the material, it has heretofore been very difficult to remove uniformly the excess water content of the raw mixture down to the correct percentage and thus provide a putty of uniform consistency and plasticity. If the water be removed from the top the lower part of the mixture becomes too hard, while removal from the bottom of the mixture is impossible due to the before mentioned settling characteristics of the material. Furthermore, once the putty hardens or "sets," it is thereafter unfit for use. All of these difficulties have led to great waste of material and expensive operation.

As the result of long experiments in an effort to supply builders with ready mixed, properly aged lime putty of the proper consistency for use when needed for plastering buildings and thus obviate the necessity for using improvised means and an inferior plaster on the job we have finally developed a simple apparatus whereby lime putty may be prepared and properly aged with all the conditions thereof controlled.

Briefly, our invention comprises a tank for receiving the raw mixture in a liquid or semi-liquid state and embodying controllable filter means whereby the excess water content of the mixture may be gradually and uniformly removed, halted or increased as the mixture ages. We have found that by so controlling the water content in the aging mixture the plasticity and consistency of the mixture may be definitely controlled and a mixture of uniform consistency and proper aging delivered to the trade. In order to minimize the labor and expense of operation of the apparatus we elevate the aging tank so that the water control and the removal of the aged mixture from the tank is accomplished by gravity.

Apparatus embodying features of our invention is illustrated in the accompanying drawings forming a part of this application wherein Fig. 1 is a vertical sectional view of our improved apparatus;

Fig. 2 is a plan view thereof with the cover removed; and

Figs. 3 and 4 are views similar to Figs. 1 and 2 and showing a modified form of apparatus.

Referring to the drawings for a better understanding of our invention we show in Figs. 1 and 2 a water tight tank 10 preferably made of metal into which the mixture to be aged is put in a liquid or semi-liquid state. The tank 10 is supported upon uprights 11 of such a height that a truck 12 may readily drive under the tank to receive the aged mixture which is discharged through the bottom of the tank through an opening 13 and a chute 14 controlled by a valve 16.

We provide the bottom of the tank shown in Figs. 1 and 2 with a wood floor 17 spaced from the metal bottom by means of strips 18 and having the space between the wood floor and metal bottom filled with sand to provide a filter. The boards of the floor 17 are loosely fitted so that water from the mixture may readily seep into the sand. At spaced intervals around the wall of the tank 10 we provide angle irons 20 to which are bolted scantlings 19 which extend from the floor 17 to the top of the tank. Across these scantlings 19 are secured boards 21 so that a plurality of pockets are formed around the walls of the tank. These pockets are filled with sand so that the excess water content of the mixture seeps uniformly from top to bottom of the mixture between the boards and into the sand. We have found with this structure that while the water readily flows into the sand the sand does not seep between the boards and become incorporated in the mixture.

Connected to the bottom of the tank 10 and in communication with the filter space between the wood floor and bottom of the tank we provide valve controlled openings 22 whereby the removal of the water from the mixture may be controlled or halted as desired. A cover 23 for the tank prevents the collection of dirt and impurities by the mixture. In event that a batch of the mixture is becoming too thick for easy working, we entirely shut off the valved openings 22 in the bottom and may add more water by putting it in the pockets between the wall 10 and the boards 21. By thus controlling the water content, we have found that the product is of uniform consistency and the consistency may be accurately controlled. In practice, we remove the excess water until the mixture contains approximately 60% water, whereupon it is the proper consistency for working. If the water content falls below this percentage, more water is added as described.

Referring now to Figs. 3 and 4 we show a modified form of our invention wherein an elevated metal tank 26 is employed. Instead of providing sand filled pockets around the walls as shown in Figs. 1 and 2 and providing a wood floor spaced from the bottom of the tank, we provide filter boxes 27 extending from the bottom to top of the tank and filled with sand. The filter boxes 27 are made from loosely fitted boards 28 so that the excess water in the mixture is free to seep into the sand, or water may be added to the box 27 to supply more water to the mixture and thus control the consistency and plasticity of the mixture. Valved openings 29 are provided in the bottom of the tank communicating with the filter boxes 27 and by means of these openings the rate of withdrawal of excess water from the mixture may be definitely controlled. In all other respects the modification disclosed in Figs. 3 and 4 is the same as that disclosed in Figs. 1 and 2.

In operation, we provide a plurality of tanks such as we have described and illustrated so that a continuous supply of properly aged mixture may be had for the trade. As soon as the mixture in a tank is properly aged it may be discharged, at any time, from the lower portion thereof by gravity into a truck and carried directly to the operation where it is to be used. When a tank has been entirely emptied, a new batch of liquid or semi-liquid mixture is placed therein for aging. While being aged, the rate of withdrawal of excess water is controlled by the valved openings in the bottom of the tank so that the consistency and plasticity of the mixture is under definite control. In event the demand for the aged mixture lessens, or in event a mixture is getting too thick for working, the removal of water is halted or water is added to the mixture through the filters.

From the foregoing it will be apparent that we have devised an improved apparatus for aging lime putty and like plastic mixtures which is simple of design and operation and by means of which a supply of ready mixed, properly aged, lime putty may be supplied direct to builders and other users thereof.

While we have shown our invention in but two forms, it will be obvious to those skilled in the art that it is not so limited but is susceptible of various other changes and modifications without departing from the spirit thereof and we desire therefore that only such limitations shall be placed thereupon as are imposed by the prior art, or as are specifically set forth in the appended claims.

What we claim is:

1. In apparatus for aging lime putty and like plastic mixtures, the combination of an elevated water tight tank, permeable filter means extending throughout the depth and along the bottom in the tank, controllable means for removing excess water from the mixture by gravity, and separate means for removing the contents of the tank by gravity.

2. In apparatus for aging lime putty and like plastic mixtures, an elevated liquid tight tank, a sand filter extending along the sides and bottom in the tank in communication with the mixture, means for holding the sand in the filter against incorporation in the mixture, controllable means for withdrawing water absorbed by the filter from the mixture by gravity, and separate controllable means for removing the aged mixture from the tank by gravity.

3. In apparatus for aging lime putty and like plastic mixtures, an elevated liquid tight metal tank, filters extending from the bottom of the tank upwardly for absorbing excess water from the mixture, permeable sides for the filters, and valve controlled water withdrawal means at the bottom of the filters for removing excess water from the mixture and controlling the consistency thereof.

4. In apparatus for aging lime putty and like plastic mixtures, an elevated water tight tank, filters extending from the bottom of the tank upwardly for absorbing excess water from the mixture, permeable sides for the filters, valve controlled water withdrawal means at the bottom of the tank and communicating with the filters for removing excess water from the mixture and controlling the plasticity thereof, and valve controlled mixture withdrawal means at the bottom of the tank to withdraw the aged mixture therefrom.

In testimony whereof we affix our signatures.

WILLIAM H. BROOKS.
FRANCIS M. TAYLOR.